United States Patent Office 3,298,704
Patented Jan. 17, 1967

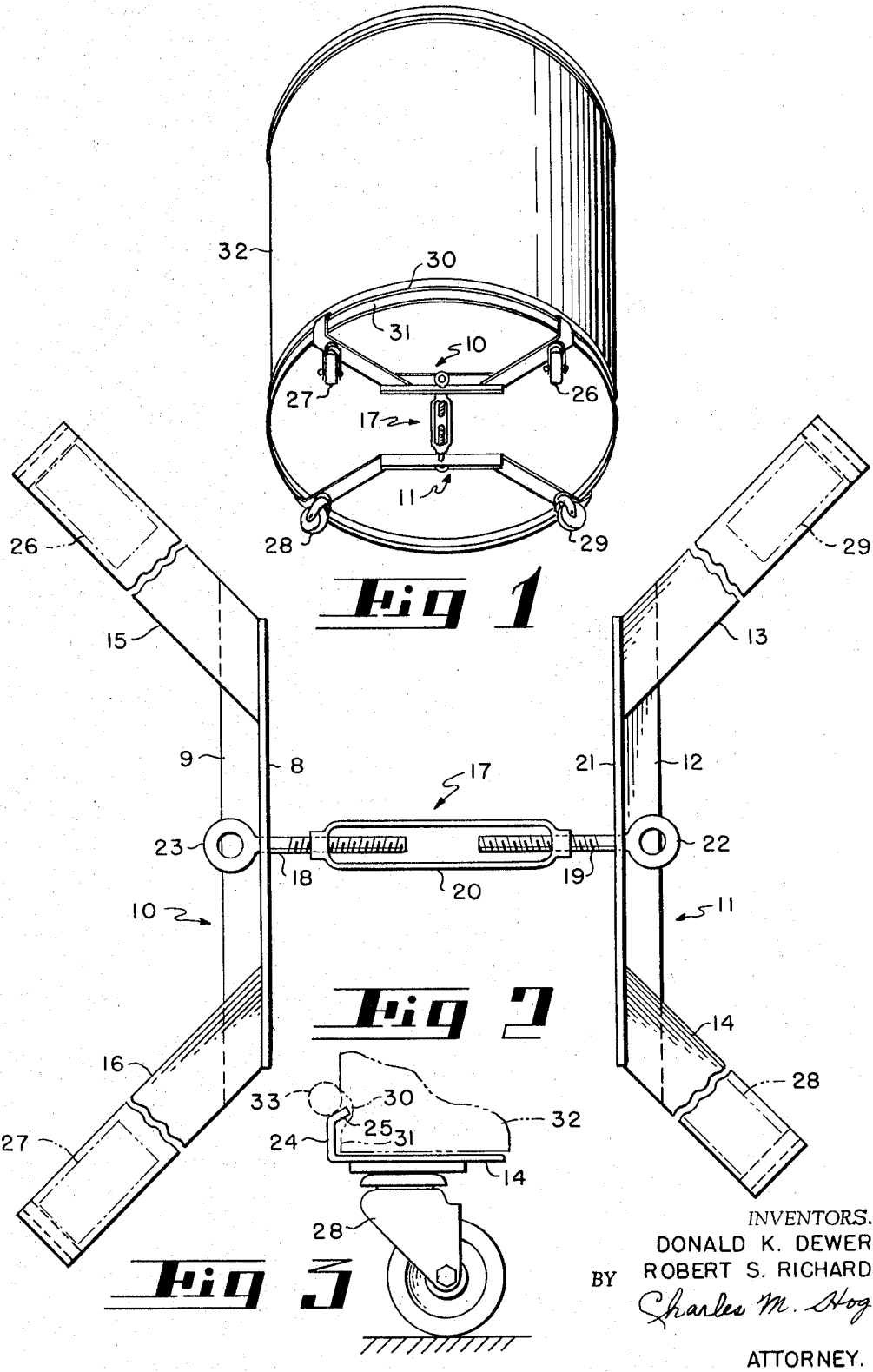

3,298,704
CLAMP-ON ADJUSTABLE DOLLY
Donald K. Dewers, 102 Dawn Drive, Aurora, Ind.
47001, and Robert S. Richards, 313 Whitewater Drive,
Harrison, Ohio 45030
Filed Apr. 7, 1965, Ser. No. 446,166
3 Claims. (Cl. 280—35)

The present invention relates generally to supports for the transportation of containers and specifically to a novel clamp-on type of dolly which is of particular utility as employed for the moving of metallic or fiber drums or cylindrical containers.

The principal object of the invention is to provide an attachable dolly of the type under consideration which is readily useful with a range of sizes of drums or containers.

Another object of the invention is to provide an attachable dolly construction which is not only readily adjustable but which is also so related to the drum that the dolly construction is ready of access either for purposes of making an adjustment or changing one.

It is also a fundamental object of the invention to provide an attachable dolly construction of such a nature that, when it is in use, it prevents the container tip-over to which prior art trucks and dollies have been susceptible.

A further object is to provide an attachable dolly formed with minimum protrusions so that the probability undesired impact with walls and room trim is minimized and so that resultant damage is also reduced.

Another object of the invention is to provide a dolly construction which is easily and quickly attached to or removed from the container to be transported and which is light in weight and yet sufficiently strong to carry either light or heavy loads.

A further object is to provide a dolly construction of such character that its adjustment feature contributes to its strength and does not decrease structural efficacy.

For a better understanding of the invention, together with other and further objects and advantages thereof, reference is made to the following description of the appended drawings, in which:

FIG. 1 is a perspective view of a container in tilted position, showing a preferred form of clamp-on dolly in accordance with the invention, in place;

FIG. 2 is a plan view of the improved clamp-on dolly; and

FIG. 3 is a fragmentary view of the outer end of a representative wing member, its hook formation and associated caster, looking edgewise at the side of that end.

It will be understood at the outset that the specific dimensions and parameters herein mentioned are furnished by way of illustration and not of limitation, these parameters having been found suitable in an embodiment of the invention which has actually been reduced to successful practice and tested.

The dolly attachment comprises a pair of winged identical clamp members 10 and 11. Since the clamp members are identical it will be understood that the specific description of member 11 is equally applicable to member 10. The clamp member 11 comprises an angle-iron body 12 and a pair of wings 13 and 14 having flat surfaces secured to the flat surfaces (horizontally extending in FIG. 2) of the body member adjacent its ends. The wings 13 and 14 diverge outwardly and converge toward the body 12. In the position of adjustment illustrated in FIG. 2 the four wings 13, 14, 15 and 16 of the two clamp members 11 and 10 happen to be oriented in a generally cruciform fashion. The clamp members 10 and 11 are adapted adjustably to be drawn together by a turnbuckle 17 which comprises a lefthand threaded key screw 18 and a righthand threaded key screw 19, each secured in complementary threads formed in a turnbuckle adjustment member 20. Key screw 18 projects through vertically oriented portion 8 of body member 9 and key screw 19 projects through vertical portion 21 of body member 12 in such fashion as to place the keys 22 and 23—these being integral with the key screws—in convenient position for adjustment. As shown in the preferred embodiment these keys are ring shaped in form. It will be understood that turnbuckle member 20 or key 22 or 23 may be turned in order to control the clamping action of the clamp members 10 and 11.

Each wing member, for example wing member 14, is formed at its outer end (FIG. 3) with a vertically extending portion 24 terminating in a diagonally extending portion 25, the included angle between the portions 24 and 25 approximating 120 degrees in an illustrative embodiment of the invention. Closely adjacent said outer end there is attached to wing member 14 a plate-top swivel type caster 28. It will be understood that four casters 26, 27, 28 and 29 are provided near the four wing ends, as illustrated in FIG. 1, all the casters being identical. The portions 24 and 25 constitute an integral hook which articulates with and fits into the annular groove or recess 30 conventionally provided in drums and containers for which the invention is particularly adapted. This hook also articulates with bead 31 (FIG. 3) or the annular protuberance provided in some containers.

In constructing the dolly there are utilized four pieces 13–16 of flat hot-rolled steel, approximately 1/8" x 1¼" x 8½". One end of each piece of flat stock is cut off at a 45 degree angle. The other end is given the double bend hook formation 24–25 to form the hook for fastening to the bottom side of the recessed (see 30) ring on the container. Four swivel type casters 26–29 are then spot welded ¼" inboard of the hooks. The four flat iron wings 13–16 are then preferably welded or optionally riveted, to two ¾" angle irons 9 and 12 seven inches in length. This will make two separate unitary clamp members 10 and 11 each consisting of two flat iron stock wing pieces and one angle-iron body piece.

After the angle-irons have been made in the manner indicated above holes are drilled through the vertical sections 8 and 21 for insertion of the key screws 18 and 19 which project through those openings into the adjustable body member 20 of the turnbuckle.

In usage the two clamp members 10 and 11 are placed onto the bottom of the drum or container 32 with the wings extending outwardly and the portions 8 and 21 of the angle-irons or body members 9 and 12 facing one another. Then the turnbuckle is adjusted to the desired tension. This can be done by rotating sleeve element 20 of the turnbuckle and/or by turning the keys 22 and/or 23.

Since the body and wing elements of each clamp member are welded together, they are essentially a one-piece construction and can be so made by known processes.

Attention is invited to FIG. 3 and the manner in which the hook portions 24, 25 interfit with the groove 30 and bead 31 on drum 32, all in such a manner that protuberances from the dolly are minimized. Additionally, the residual recess in groove 30, not occupied by hook portion 25, can be filled by an annular band of plastic or some other soft material 33, which can be slipped over the drum in order to serve as a bumper. Attention is also invited to the fact that, depending upon the position of the user, the adjustment of the turnbuckle elements 20, 18 and 19 can be made, so that a plurality of types of access are afforded for adjustment purposes.

Thus it will be seen that in accordance with the invention there has been provided a clamp-on adjustable dolly for the convenient elevation and transportation of drums 32 of the type including annular groove 30 comprising: an identical pair of one-piece clamp members 10 and 11 and an intermediate turnbuckle 17 for drawing the clamp members together, each clamp member comprising a body (such as 12) and a pair of wings (such as 13 and 14) diverging from the body, said wings having upwardly and inwardly formed outer ends (see 24–25) formed to engage said annular groove and each clamp member further comprising casters (such as 28 and 29) individually journaled adjacent said ends, said turnbuckle comprising a manually operable adjusting sleeve 20 and fastening screws 18 and 19 individually projecting through the bodies 12 and 9 and formed with opposed threads. The screws 18 and 19 are optionally formed with key portions 22 and 23.

The expression "annulus" is intended to designate an annular recess or bead or band-like protuberance or similar annular discontinuity.

While there has been shown and described what is at present considered to be the preferred embodiment of the invention, it will be understood by those skilled in the art that various changes and modifications may be made therein without departing from the proper scope of the invention as defined by the appended claims.

We claim:

1. A clamp-on adjustable dolly for the convenient support and transportation of drums of the type including an annulus comprising: an identical pair of clamp members and a single intermediate tension device, normally secured to the clamp members but removable from the clamp members, for drawing the clamp members together, each clamp member comprising a body and a pair of wings diverging rigidly diagonally outwardly from the body, the wings having outer ends formed as upwardly extending hooks to engage said annulus, each clamp member further comprising casters individually journaled adjacent and radially inwardly of said ends, the pairs of ends of the clamp members being formed to span parallel chords of the drum, each pair of wings spanning a chord whereby tightening of the tension device causes the hooks to exert inwardly directed compression forces against said annulus at four spaced points.

2. A clamp-on adjustable dolly in accordance with claim 1 in which the tension device is a turn-buckle.

3. A clamp-on adjustable dolly in accordance with claim 2 and in which each clamp member is of one-piece construction.

References Cited by the Examiner
UNITED STATES PATENTS

| | | | |
|---|---|---|---|
| 1,642,094 | 9/1927 | Sviageninov | 280—35 X |
| 1,853,318 | 4/1932 | Peters | 280—35 |
| 2,558,144 | 6/1951 | McComie | 280—35 |
| 2,598,831 | 6/1952 | Ramey | 280—35 |

FOREIGN PATENTS 526,067  9/1940  Great Britain.

BENJAMIN HERSH, *Primary Examiner.*

M. S. SALES, *Assistant Examiner.*